United States Patent [19]

Bart et al.

[11] 4,218,698

[45] Aug. 19, 1980

[54] TV GRAPHICS AND MIXING CONTROL

[75] Inventors: Theodor E. Bart, Zurich; Ronald A. Mills, Küsnacht, both of Switzerland

[73] Assignee: RCA Corporation, New York, N.Y.

[21] Appl. No.: 24,151

[22] Filed: Mar. 6, 1979

[30] Foreign Application Priority Data

Mar. 13, 1978 [GB] United Kingdom .............. 09893/78

[51] Int. Cl.$^2$ ............................................. H04N 5/22
[52] U.S. Cl. ..................................... 358/22; 358/183
[58] Field of Search ....................... 358/12, 22, 74, 93, 358/183, 243

[56] References Cited

FOREIGN PATENT DOCUMENTS

| | | | |
|---|---|---|---|
| 2625347 | 4/1977 | Fed. Rep. of Germany ............. | 358/22 |
| 1413496 | 11/1975 | United Kingdom ..................... | 358/183 |
| 1146140 | 12/1975 | United Kingdom ..................... | 358/182 |

OTHER PUBLICATIONS

*The TIFAX XM 11 Teletext Decoder*, Application Report No. B183, published by Texas Instruments, Ltd. of Bedford, England.

*Primary Examiner*—James W. Moffitt
*Assistant Examiner*—Aristotelis M. Psitos
*Attorney, Agent, or Firm*—Eugene M. Whitacre; W. H. Meagher; Ronald H. Kurdyla

[57] ABSTRACT

A system employed in a television receiver for decoding and displaying graphics information such as may be encoded on a broadcast video signal. The system includes a graphics signal decoder supplied with the encoded video signal, and a plurality of transmission gates responsive to logic control signals derived from outputs of the decoder. The gates are coupled to inputs of video output stages in the receiver, and operate in response to the control signals for interrupting normal video signals to the video output stages and for enabling a voltage representative of a graphics display intensity level to be coupled to the video output stages when graphics information is to be displayed. The system also includes a graphics level control network. The level control network limits excessive graphics representative beam current levels to prevent image defocusing and kinescope screen burn. The level control network also adjusts the graphics display intensity level in accordance with the level of image representative video signals in a mixed video plus graphics display mode, to preserve a desired contrast relationship between the displayed video and graphics information.

14 Claims, 5 Drawing Figures

TV GRAPHICS AND MIXING CONTROL

This invention concerns an arrangement for displaying graphics or alphanumeric information by an image reproducing kinescope in a television receiver or equivalent video signal processing system. In particular, the invention concerns such an arrangement to facilitate coupling of graphics signals to video signal processing stages of the receiver, and to automatically adjust and limit the intensity of displayed graphics information.

A color television receiver, for example, can be arranged to display either normal video information alone in a conventional manner, graphics information alone (e.g., "video games" or alphanumeric data displays), or mixed video and graphics information (e.g., superimposed subtitles, weather, sports or road traffic information). Graphics information signals can be advantageously provided in a "Teletext" system for example, which involves transmitting alphanumeric and other graphics information through conventional television transmitting equipment, and receiving, decoding and displaying the graphics information by means of a conventional television receiver. A Teletext graphics signal comprises coded digital information which is sent as a series of digital address codes, during two horizontal line periods, towards the end of the vertical blanking period of the composite video signal. In accordance with one such system, lines 17 and 18 in one field and lines 330 and 331 in another field are used. Additional details of such a Teletext system are contained in an article entitled "Teletext Data Decoding - The LSI Approach" by B. Norris and B. Parsons, published in IEEE Transactions on Consumer Electronics, pages 247–252, August 1976, and in a "Broadcast Teletext Specification" (September 1976) published by the British Broadcasting Corporation.

In one graphics display system employing the "TIFAX XM11" decoder available from Texas Instruments, Ltd. of Bedford, England, as described in application report No. B183 for this decoder, graphics information signals are supplied directly in amplified form as high level drive inputs to video output stages of the receiver. In contrast to this approach, in accordance with the principles of the present invention, a plurality of digitally controlled transmission gates is employed for switching a bias voltage representative of a graphics display intensity level to the video output stages when graphics information is to be displayed. This approach advantageously permits the graphics information to be supplied to standard video signal processing stages such as video output stages so that the number of required interfacing elements and circuit modifications are minimized, signal loss is minimized, and high frequency response is preserved to maintain good image definition.

In a graphics display system, excessive kinescope beam current levels produced in response to kinescope drive signals can cause image defocusing which can distort or obscure small text or symbols, or which can cause "screen burn" when stationary patterns are displayed. Also, in the mixed display mode when graphics information is displayed together with normal television picture information, the degree of contrast between the graphics and picture information can vary due to variations in the level of the television signal. Thus, displayed graphics information may appear too intense (e.g., when the displayed television picture is dark in the vicinity of the graphics information), or obscured (e.g., when the television picture is bright in the region of displayed graphics information). It is herein recognized as desirable to limit the intensity of displayed graphics information by limiting the signal drive to the kinescope, and to automatically maintain a predetermined relationship between the intensity of displayed graphics information and the variable level of the television signal.

Graphics signal display apparatus which facilitates interfacing the graphics signal source with standard video signal processing circuits, and which includes provision for automatically controlling the level of intensity of the graphics display, is provided in accordance with the principles of the present invention in a video signal processing system including a video signal processing channel, an image display kinescope, and a network for coupling processed video signals from the video channel to intensity control electrodes of the kinescope. Signals representative of graphics information to be displayed are derived from a source of signals containing graphics information, and a local bias source provides a graphics intensity bias signal representative of a desired level of displayed graphics information. A first switching network has a signal input terminal coupled to the video channel, a signal output terminal coupled to the coupling network, and a switching control input terminal. A second switching network has a signal input terminal for receiving the graphics bias signal, a signal output terminal coupled to the coupling network, and a switching control input terminal. Switching control of the first and second switching networks is provided by output signals from a control circuit which responds to the derived signals. In a normal operating mode when video signals alone are to be displayed, the first switching network conducts video signals to the coupling network, and the second switching network inhibits conduction of the graphics bias signal to the coupling network. In a graphics display operating mode, the first switching network inhibits conduction of video signals to the coupling network, and the second switching network enables the graphics bias signal to be conducted to the coupling network during graphics display intervals.

In accordance with a feature of the invention, the bias source is coupled to the video channel for monitoring the level of the video signals, and includes means for varying the magnitude of the graphics intensity bias signal in accordance with the level of the video signals in a mixed graphics display mode, to thereby maintain a desired relationship between the intensity of displayed graphics information and the level of the video signal.

In accordance with a further feature of the invention, the bias source includes means for establishing minimum and maximum levels of the graphics intensity bias signal, and for controlling the level of the graphics bias signal in a direction to reduce kinescope current conduction under conditions which would otherwise cause excessive kinescope current conduction.

Figure 1:
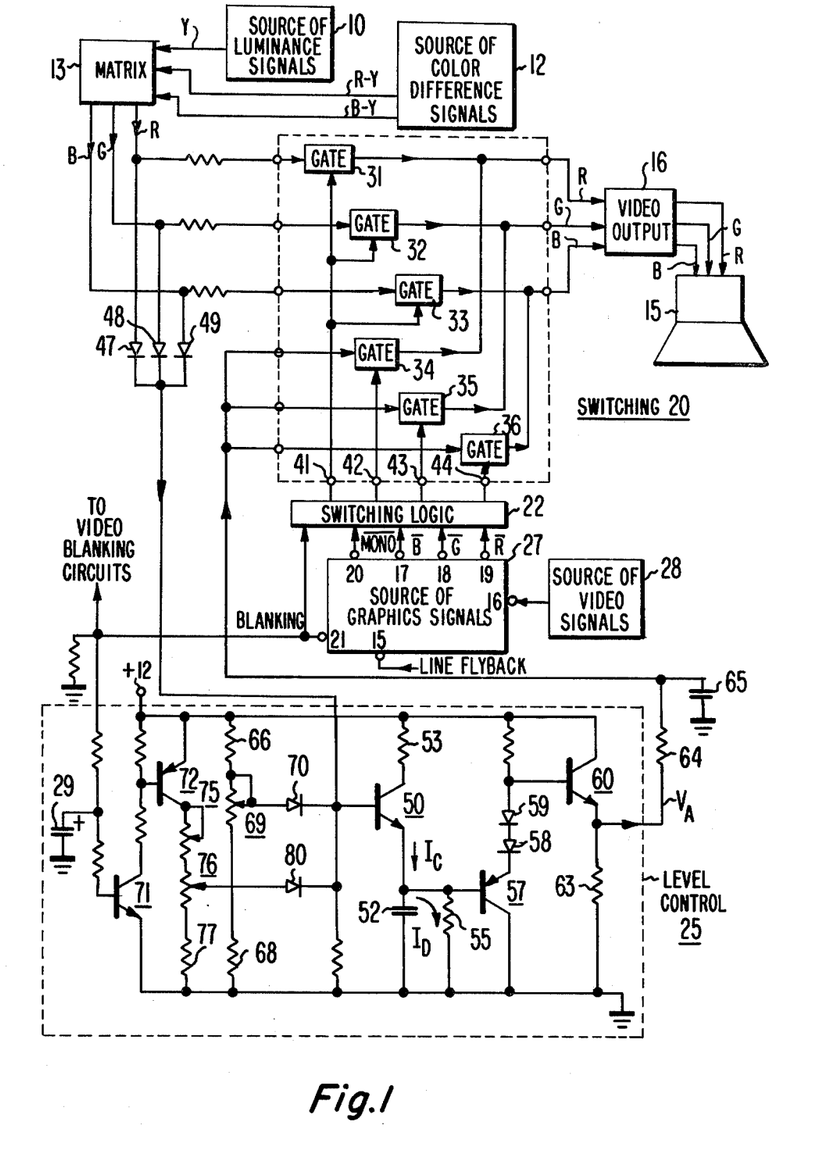
FIG. 1 shows a portion of a color television receiver partly in block diagram form and partly in schematic circuit diagram form, including a graphics display arrangement according to the present invention.

In FIG. 1, a source of luminance signals 10 in a luminance channel of a color television receiver provides an output luminance signal Y, and a source of color difference signals 12 in a chrominance channel of the receiver provides output color difference signals R-Y and B-Y. Sources 10 and 12 include conventional television signal detecting, amplifying and other signal processing circuits. The luminance and color difference signals are combined in a matrix 13 for providing R, B and G color image representative output signals. These signals are applied to respective intensity control electrodes of a color kinescope 15 via a video output stage 16, and a switching stage 20. Video output stage 16 may comprise a plurality of cascode video amplifiers of the type described in U.S. Pat. No. 4,051,512, for example.

The graphics display system includes switching stage 20, a switching logic control unit 22, and a level control circuit 25, and a graphics signal source 27 which provides decoded graphics information signals and control signals. In this example, graphics signal source 27 corresponds to the "TIFAX XM11 Teletext Decoder" available from Texas Instruments, Ltd. of Bedford, England.

Graphics source 27 receives Teletext encoded video signals at an input terminal 16 from a source of video signals 28 (e.g., from the output of a video detector stage in the receiver), and also receives horizontal line flyback synchronizing pulses such as may be derived from horizontal deflection circuits of the receiver at an input terminal 15. Source 27 provides digital output signals for ultimately determining the signals applied to kinescope 15 during graphics display intervals. An output BLANKING control signal from a terminal 21 of source 27 is applied to logic unit 22, level control circuit 25, and also to video blanking circuits of the receiver. Analog video signals are absent or blanked when the receiver is used to display graphics alone in the "graphics only" mode. Digital $\overline{R}$, $\overline{G}$ and $\overline{B}$ signals from output terminals 19, 18 and 17 of graphics source 27 are representative of the graphics information to be displayed, and are provided from source 27 either singly or in combination. A $\overline{MONO}$ digital control signal from an output terminal 20 of unit 27 is utilized to disable the transmission of the analog R, G, B color signals from matrix 13 to kinescope 15 in order to make display space available for graphics information in the mixed display mode. This signal exhibits a duration which corresponds to an interval during which the graphics information is present in the mixed display mode. The terminal numbers shown within block 27 correspond to the actual numbers of the external signal terminals of the TIFAX XM11 decoder. More detailed information concerning the TIFAX XM11 decoder is contained in Application Report No. B183 for this decoder.

The digital control signals from graphics source 27 are processed by logic unit 22, which in turn develops output digital control signals for controlling the operation of switching unit 20. Switching unit 20 comprises an array of analog signal transmission gates (electronic switches) 31-36 for switching the signal inputs of the video output amplifiers within output stage 16 between normal analog television signals and graphics signals. Each gate is a three-terminal device having a signal input terminal, a signal output terminal, and a control terminal to which digital signals are applied for controlling the on/off operation of the gate.

In the normal operating mode of the receiver when it is desired to display only analog television signals, gates 31, 32 and 33 are "closed" (i.e., rendered conductive) to permit the analog R, G, B signals from matrix 13 to be conducted to kinescope driver 16. This is accomplished in response to an enabling digital control signal from a terminal 41 of logit unit 22, which is coupled in common to the control terminals of gates 31-33. At the same time, gates 34, 35 and 36 are "opened" (i.e., rendered nonconductive between the signal input and output terminals) in response to disabling digital control signals respectively applied to the control terminals of these gates from output terminals 42, 43 and 44 of logic unit 22. When graphics information is to be displayed, digital signals, from graphics source 27 and logic unit 22 cause gates 31-33 to open, thereby preventing analog television signals then present from being conducted to kinescope 15 during the graphics interval. Logic unit 22 provides one or more digital control pulses from terminals 42-44 during this interval, causing one or more of gates 34-36 to close. Those of gates 34-36 which close couple the associated R, G or B input of kinescope driver 16, and thereby the associated intensity control electrode of kinescope 15, to a graphics intensity bias voltage which is supplied as a common input to gates 34-36 from level control unit 25, as will be discussed. The kinescope screen is then illuminated in response to this bias voltage during the graphics interval.

Switching stage 20 and logic unit 22 are shown in greater detail in FIG. 2, which will be discussed subsequently.

Continuing with FIG. 1, level control circuit 25 serves to automatically control the intensity of the displayed graphics information in accordance with the level of the R, G, B signals from matrix 13 during the mixed display mode, since the legibility of displayed graphics characters is dependent on television image content in the mixed mode. For example, white graphics characters would be difficult to discern against a light image background.

The R, G, B signals from matrix 13 are combined by means of positive peak rectifier diodes 47, 48 and 49 to form a combined signal with a magnitude corresponding to the peak level of the R, G, B signals. The combined signal is coupled to an input of level control circuit 25 and serves to vary the base bias of a transistor 50 in accordance with the magnitude of the combined signal. Transistor 50 develops a corresponding emitter current ($I_C$) which charges a storage capacitor 52. A time constant determined by the value of capacitor 52 and a bleeder resistor 55 is slightly greater than the time of one image scanning field so that a voltage developed on capacitor 52 closely approaches and tracks with the level of the combined analog signal. A bleeder resistor 55 provides a path to ground for capacitor discharge current $I_D$. A resistor 53 serves as a current limiting resistor for collector current of transistor 50.

The voltage developed on capacitor 52 is translated via a D.C. coupled PNP follower transistor 57, series diodes 58, 59 and an NPN follower transistor 60, and appears across a resistor 63 in the emitter circuit of transistor 60 as a graphics intensity bias control voltage $V_A$. Voltage $V_A$ is coupled via a current limiting resistor 64 to the signal inputs of gates 34-36 in switching stage 20, for determining the intensity of displayed graphics information. Since voltage $V_A$ varies with the level of the combined R, G, B signals, the intensity of displayed graphics information also varies with the R, G, B signals. It is noted that the offset voltage drop associated with diodes 47, 48, 49 and the base-emitter junction offset voltage of transistors 50, 60 are compensated for by the combined effect of the base-emitter junction offset voltage of transistor 57 and the offset voltage across diodes 58, 59. Thus the peak-representative voltage level at the emitter output of transistor 60 is substantially equal to the peak value of the combined analog signal from diodes 47, 48 and 49, and is also compensated for temperature variations by means of the offset voltage drops noted above.

When the television signal is representative of a dark scene with a low brightness level in the mixed display mode, it is desirable for the intensity of the displayed graphics information to exceed the low brightness level of the television image. In this instance, the charge on capacitor 52 is determined by a voltage divider comprising resistors 66, 68 and an adjustable resistor 69 coupled to a source of direct voltage (+12 volts). Resistor 69 is pre-set to establish a minimum level of graphics display intensity. When the television signal is representative of scenes of average or high brightness, a diode 70 is reverse biased (non-conductive) and resistors 66, 68 and 69 are decoupled from transistor 50 and capacitor 52. Capacitor 52 then charges as discussed above. Under low brightness conditions, however, the base voltage of transistor 50 becomes sufficiently less positive so that diode 70 becomes forward biased into conduction, thereby permitting capacitor 52 to charge via resistor 66, diode 70 and transistor 50 to a level greater than otherwise would have occurred under low brightness conditions. Accordingly, voltage $V_A$ and thereby the intensity of the displayed graphics information are maintained at a desired minimum acceptable level in the mixed display mode. The intensity of displayed graphics information is less critical in the "graphics only" display mode, when there is no displayed analog picture information surrounding the graphics information. The graphics intensity level in the "graphics only" mode is set by potentiometer 76 as discussed below.

In the "graphics only" display mode, the BLANKING signal from source 27 comprises a fixed positive D.C. level which causes the video blanking circuits of the receiver to inhibit the analog television signals, and which causes transistors 71 and 72 of circuit 25 to conduct with the result that a bias voltage is developed across potentiometer 76. In the mixed display mode, however, the BLANKING signal comprises a series of short duration positive pulses which correspond to the conventional horizontal retrace blanking and vertical retrace blanking pulses. The BLANKING signal remains at a "low" level during television image line display intervals, at which time the receiver blanking circuits permit the analog television signal to be processed normally and coupled to matrix 13. The blanking pulses developed in the mixed display mode are prevented from activating transistor 71 in level control circuit 25 by means of a low pass RC filter including a filter capacitor 29 coupled to a base input of transistor 71. This filter serves to filter out the mixed display mode blanking pulses, rendering transistors 71 and 72 nonconductive in the mixed mode, and thereby preventing a bias from being developed across potentiometer 76 during the mixed mode. The graphics display operating bias in the mixed display mode is obtained as explained above.

In the "graphics only" display mode, the D.C. level blanking signal from source 27 causes transistor 71 to conduct. A PNP transistor 72 also conducts in response to the conduction of transistor 71, and develops a collector voltage for biasing a voltage divider network comprising an adjustable resistor 75, potentiometer 76 and a resistor 77 arranged in series in the collector circuit of transistor 72. A diode 80 becomes forward biased in response to a voltage then developed at a wiper of potentiometer 76, and voltage $V_A$ at the output of circuit 25 substantially equals the voltage appearing at the wiper of potentiometer 76. Resistor 75 is pre-set to limit the intensity of the displayed graphics information and thereby the magnitude of kinescope beam current to a level which is not expected to damage the kinescope display screen (i.e., due to "burn-in" effects). Potentiometer 76 is an optional control to permit a viewer to adjust the maximum graphics intensity to some other level if desired.

Kinescope beam current associated with the displayed graphics information must be limited at a safe long-term average level, and also at a substantially higher short-term peak value. The peak value chosen typically represents a compromise between a current level associated with a desired peak level of graphics display intensity, and a level which does not produce objectionable spot blooming with attendant loss of image definition. Level control circuit 25 is arranged so that the open circuit value of voltage $V_A$ corresponds to a desired peak graphics drive level to the input of video output stage 16. Short duration graphics representative current peaks into video stage 16 are supplied from a charge storage capacitor 65, which is regularly being recharged from circuit 25 through a resistor 64. The average graphics representative current is normally significantly less than the peak current and, therefore, the normal charge on capacitor 65 closely approximates the open circuit level. However, if a large amount of graphics information is displayed, the average beam current will be high. The graphics representative current then supplied to video output stage 16 will also be large, and a significant voltage drop is developed across resistor 64. The value of resistor 64 is chosen so that this voltage drop reduces the effective value of voltage $V_A$ to a level which produces a safe level of average kinescope beam current.

In practice, a color television receiver typically includes provision for adjusting the video output stage for a desired threshold conduction level (black level), and for adjusting the signal gain (white balance) of the output stage in a service or set-up operating mode of the receiver. This is typically accomplished by means of variable resistors or potentiometers (not shown) associated with the video output stage. The graphics control system may also include provision for setting the normal "white level" or intensity of displayed graphics information in the graphics mode to correspond to the normal "white level" of the video signal as determined by adjustment of the video output stage during the service mode. This adjustment can be accomplished by means of optional adjustable resistors (not shown) respectively connected between the signal inputs of gates 34-36 and output voltage $V_A$ of level control circuit 25.

It is noted that the described graphics display system advantageously utilizes the signal outputs of the graphics signal source (e.g., the XM-11 or other decoder) as transmission gate control or enabling signals only. This is in contrast to graphics display systems which employ the graphics information signals in amplified form as a direct high level video drive to the video output stages, which results in added capacitance at the video output stage and an attendant loss in high frequency response. The described system also avoids the use of long video signal and return connections to the output stages, and therefore avoids problems due to spurious radiations of video frequencies in sensitive areas of the receiver. Interference due to signal frequencies generated with the receiver (e.g., due to deflection signals and power supply operation) is also minimized.

The input of the video output stage is an attractive interface point, since circuit impedances here are relatively low and stray capacitance is less of a problem. The interface transmission gates simply enable or disable the analog television signal and, in the latter case, the input to the video output stage is switched between two bias levels. High frequency response and timing accuracy are preserved, and undesired signal cross coupling effects are minimized. All of this can be accomplished in close proximity to the video output stage to minimize the likelihood of spurious signal interference. If the outputs from decoder signal source 27 were used directly to provide low level video drive signals, it may be difficult to maintain a precise white or black level balance of the graphics information because of tolerance effects or drift in the $\overline{R}$, $\overline{G}$, $\overline{B}$ decoder outputs. These difficulties are avoided in the present system, since the output signals from signal source 27 are used as logic control signals rather than as direct drive video signals.

Since in the described system the decoder output signals are not amplified to an appropriate level for driving either the kinescope directly or preceding video processing circuits, the graphics video drive level can be determined from within the graphics display system or from an appropriate source of bias potential within the receiver. This facilitates the use of various types of decoders, since the level of the decoder output signal is not critical.

Figure 2:
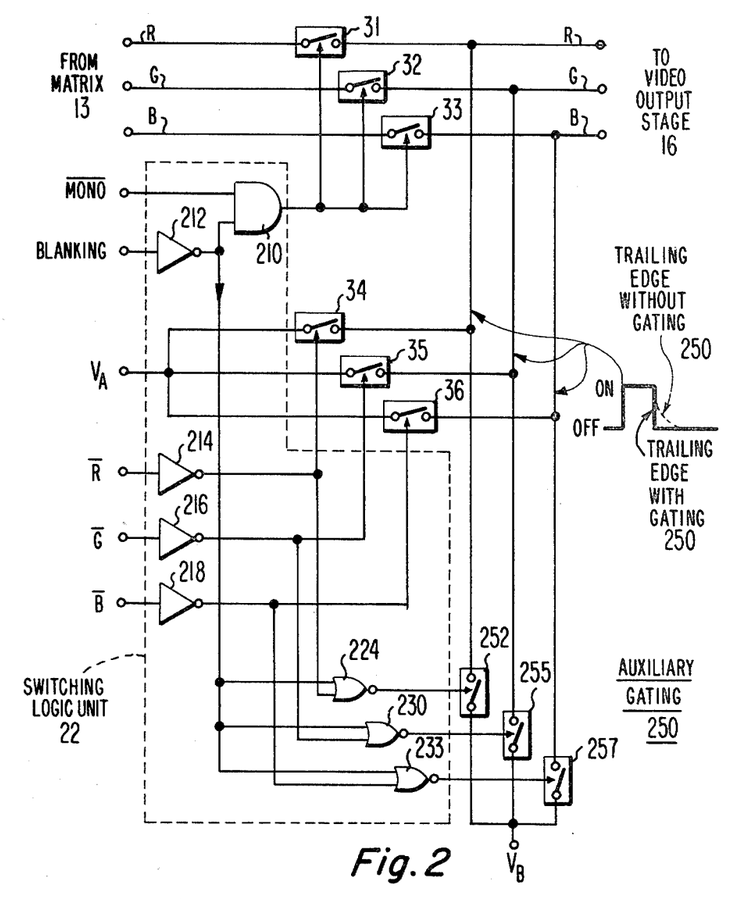
FIG. 2 shows additional details and features of the arrangement of FIG. 1.

Referring now to FIG. 2, there is shown additional details of switching stage 20 and logic unit 22 of FIG. 1. Corresponding elements in FIGS. 1 and 2 are identified by the same reference number.

Logic unit 22 includes a logic AND gate 210 responsive to the $\overline{MONO}$ signal, and to an inverted BLANKING signal supplied from an output of an inverter 212. The $\overline{MONO}$ signal is present whenever $\overline{R}$, $\overline{G}$ or $\overline{B}$ graphics signals are present, and is utilized to open gates 31-33 for the duration that graphics information is to be displayed. The output from AND gate 210 is coupled to the switching control inputs of gates 31-33 for controlling the conduction status of gates 31-33. Gate 210 and inverter 212 are arranged so that a positive output level (logic "1" or +12 volts, for example) is provided from AND gate 210 only when the $\overline{MONO}$ signal input to gate 210 is at a positive logic "1" level and the BLANKING signal input to inverter 212 is at a significantly less positive level (logic "0" or 0 volts, for example). A positive output from AND gate 210 causes gates 31-33 to close so that the analog R, G, B signals are transmitted to video output stage 16 in normal fashion. For all other conditions of the $\overline{MONO}$ and BLANKING signals, AND gate 210 produces the less positive logic "0" output level which causes gates 31-33 to open, thereby interrupting the transmission of signals R, G, B during the graphics interval. It is noted that the BLANKING signal remains at a "high" D.C. level in the "graphics only" display mode. Gates 31-33 remain permanently open in this mode, since an inverted ("low") blanking level is applied to the control terminals of gates 31-33 from the output of inverter 212 via gate 210.

Also during the graphics display intervals, one or more $\overline{R}$, $\overline{G}$, $\overline{B}$ digital output signals (logic "0" levels) are supplied from graphics control source 27 to logic unit 22. These signals are inverted to a more positive logic "1" level by inverters 214, 216 and 218, and as such are respectively applied to the switching control terminals of gates 34-36 for rendering one or more of these gates conductive to develop the graphics display by permitting graphics bias voltage $V_A$ to be coupled to one or more of the R, G, B inputs of video output stage 16, as mentioned in connection with FIG. 1.

When the graphics display interval ends, gates 34-36 return to the open condition and, if the receiver is operating in the mixed display mode, gates 31-33 return to the closed position so that signal and bias levels for R, G, B video output stage 16 comes under control of the output signals from matrix 13. However, when the receiver is operating in the "graphics only" mode, all of gates 31-36 are open when the graphics interval ends. Gates 31-33 remain open in response to the BLANKING and $\overline{MONO}$ signals from source 27 to prevent the analog television signals or noise from reaching video output stage 16.

The time between the end of the graphics interval (when the bias voltage supplied via one or more of gates 34-36 is decoupled from the video output stage), and the time when the bias level appearing at the R, G, B inputs to video output stage 16 diminishes to a level corresponding to black level, depends on a time constant formed by the input resistance and stray capacitance associated with the input circuits of video output stage 16 which were operative during the graphics display interval. If this time constant and the associated "fall time" to black level are too long, the trailing edge of the graphics display will appear to persist beyond the graphics information interval (e.g., as a gray-scale smear). This effect distorts the desired contrast of the graphics display, and is eliminated by means of auxiliary gating stage 250 including transmission gates 252, 255 and 257 in cooperation with logic NOR gates 224, 230 and 233 within logic unit 22. Gates 252, 255 and 257 are connected between the R, G, B input lines to video output stage 16 and a source of low D.C. voltage $V_B$ (i.e., a black reference level such as ground or a source of reference bias potential for output stage 16). The outputs of NOR gates 224, 230 and 233 are respectively coupled to the switching control terminals of transmission gates 252, 255, 257.

Gates 252, 255, 257 operate only in the "graphics only" mode and close when the display screen should be dark (i.e., immediately after the graphics display interval ends) in response to the BLANKING signal from source 27, which in this mode is a D.C. level. When gates 252, 255, 257 close (i.e., conduct), the input lines to output stage 16 are rapidly connected to voltage $V_B$ so that any residual charge associated with the input capacitance of the video output circuits is rapidly discharged to the level of voltage $V_B$, which preferably corresponds to a desired black level.

More specifically, the auxiliary gates are closed when the output of the associated NOR gate is at a positive level, corresponding to a logic "1" level in this example. This condition is produced when both inputs to a given NOR gate are at a logic "0" level at the end of the graphics information display interval, when the inverted BLANKING signal at the output of inverter 212 is at a "0" logic level, and when the inverted $\overline{R}, \overline{G}, \overline{B}$ signals at the outputs of inverters 214, 216, 218 are also at a "0" level. The trailing edge of the graphics information pulses is fast due to the low impedance path provided by the auxiliary gates between the video inputs of stage 16 and voltage $V_B$. The required low impedance path for black to white graphics information pulses is provided through gates 34, 35, 36.

The timing of the switching of transmission gates 31-36 is important, since an image "dot" interval associated with small graphics characters (e.g., "Teletext" characters) can have a duration of approximately 180 nanoseconds, and observations indicate that timing errors of the graphics display control signals should be less than approximately fifty nanoseconds to avoid undesirable graphics edge effects. In addition, it is desirable to enhance the appearance of the displayed graphics information when operating in the mixed display mode by surrounding each displayed graphics character with a narrow black outline. In this regard it is noted that a displayed graphics character is contained within an area sometimes referred to as a "blanking box", designating an area which is blanked or at black level except for the graphics information displayed within this area. The image areas immediately preceding and following each displayed graphic symbol are particularly significant for the purpose of providing a desired amount of graphics contrast to permit the graphics information to be more easily seen. A black outline of a graphics character can be produced as described below with reference to FIGS. 2-5.

With regard to FIG. 2, it is noted that the $\overline{R}, \overline{G}$ and $\overline{B}$ switching control signals which enable (close) one or more of gates 34-36 during the graphics interval are first passed through inverters 214, 216 and 218. These inverters introduce a small signal propagation delay ($D_1$ in FIG. 5) of approximately twenty-five nanoseconds such that the time at which gates 34-36 are closed is delayed by this amount relative to the time at which gates 31-33 open. Since video gates 31-33 open before graphics gates 34-36 close, video information otherwise transmitted via gates 31-33 is absent or blanked for a short interval before the graphics display information is transmitted via gates 34-36 to output stage 16. The leading edge of the displayed graphics information therefore appears enhanced due to the small blanking or black level interval which precedes the leading edge of the graphics information.

Figure 3:
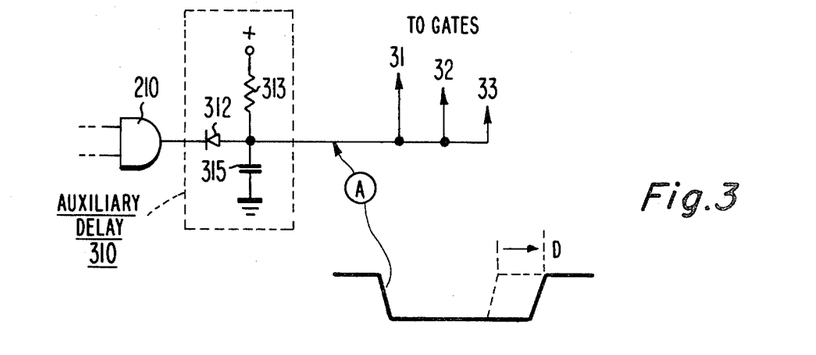
FIG. 3 depicts an additional circuit feature of the arrangement shown in FIG. 2.

The trailing edge of displayed graphics information can also be enhanced with a black outline by slightly delaying the low (disable) to high (enable) switching transition of the digital control signal applied from AND gate 210 to the switching control terminals of video gates 31-33. By slightly delaying the time when gates 31-33 are enabled to conduct video signals from matrix 13 after the graphics information has been displayed, the image area immediately following the trailing edge of the displayed graphics information will be at the blanking or black level, thereby resulting in a narrow dark outline of the trailing edge of the graphics information. This result can be obtained by employing an auxiliary delay circuit 310 as shown in FIG. 3.

Delay circuit 310 includes a diode 312, a resistor 313 and a capacitance 315 arranged as shown between the output of AND gate 210 and the switching control input terminals of gates 31, 32 and 33. Network 310 provides a propagation delay D as shown with respect to switching control or "masking" waveform A in FIG. 3 (see also FIG. 5), as follows. Capacitor 315 is normally charged to the operating supply (+) but is rapidly discharged to a low potential through diode 312 and gate 210 when gate 210 is activated. Gates 31-33 are then disabled (nonconductive). Capacitor 315 slowly recharges through resistor 313 when gate 210 is inactivated. After a time delay D, the voltage on capacitor 315 is sufficient to cause gates 31-33 to close.

Figure 4:
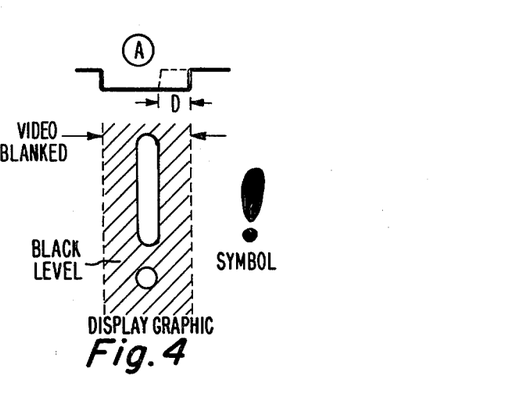
FIG. 4 illustrates a displayed graphics symbol illustrative of a feature of the present invention.
Figure 5:
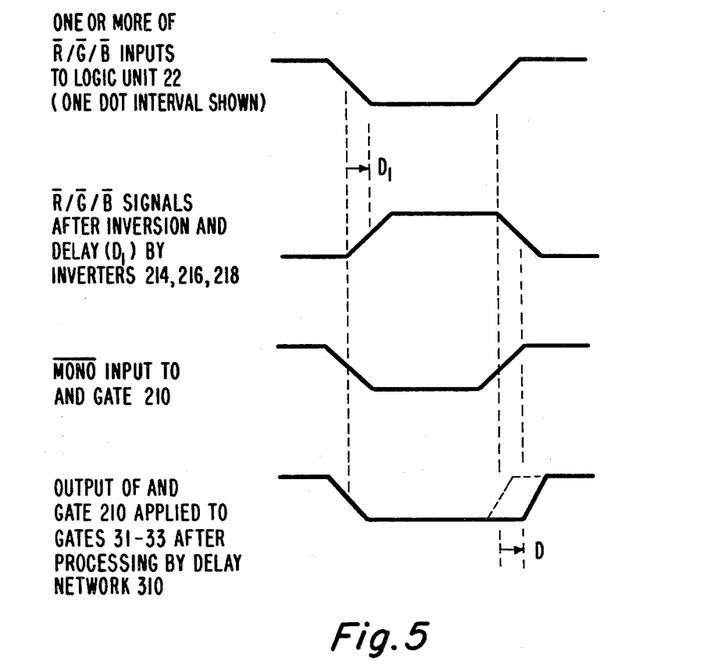
FIG. 5 shows waveforms illustrative of the timing relationships of signals utilized in the arrangement of FIG. 2.

FIG. 4 illustrates a displayed graphics symbol with edge enhancement as discussed above, and also shows the timing relationship between waveform A and the enhanced trailing edge of the displayed symbol. FIG. 5 is self-explanatory and illustrates the timing relationships between the $\overline{R}, \overline{G}, \overline{B}$ signals, the $\overline{MONO}$ signal, and the switching control output signal from AND gate 210, in the mixed display mode.

The circuit of FIG. 2 comprises standard CMOS logic components and can be constructed from presently available integrated circuits. Illustratively, CMOS integrated circuit type CD4066 can be used to provide transmission gates 31-36 and 252, 255, 257. Integrated circuit type CD4049 can be employed to provide inverters 212-218, while AND gate 210 and NOR gates 224, 230, 233 can be provided by integrated circuit types CD4081 and 4001, respectively. These integrated circuit types are available from the Solid State Division of RCA Corporation, Somerville, N.J. The circuit of FIG. 2 is capable of being fabricated in a single integrated circuit, as is level control circuit 25 with the possible exception of capacitors 29, 52 and 65.

Although the invention has been described with reference to particular embodiments, various additional modifications can be made within the scope of the invention.

Additional analog input signals (e.g., from the R, G, B outputs of a color camera or other local video information source) can also be displayed in the graphics mode, instead of digital graphics information as discussed. In this alternative use, the respective signal inputs of gates 34, 35 and 36 can be switched to receive voltage $V_A$ in common (as discussed), or to receive the additional analog signals. In the latter instance, voltage $V_A$ would be decoupled from gates 34-36, and each of these gates would be separately driven by separate ones of the additional analog signals. Also, the $\overline{R}, \overline{G}, \overline{B}$ signal inputs of inverters 214, 216, 218 and the $\overline{MONO}$ signal input of AND gate 210, and the BLANKING signal input of inverter 212 (FIG. 2) would be connected to ground, for example, when the additional analog signals are utilized in the graphics mode. An appropriate switching mechanism can be employed for this purpose.

The described system is not limited to decoding and displaying "Teletext" encoded video signals. The system can also be used for displaying alphanumeric information derived from other signal sources, such as a personal "home computer", such as the RCA VIS personal computer system. The described graphics display system is attractive for this purpose since the only external signals required are digital in nature and the signal levels are not critical. The required graphics bias signals for the video output stages are generated internally by the system, and image resolution is high since connections to narrow signal bandwidth portions of the receiver are not required.

The $\overline{MONO}$ signal can also be employed in conjunction with a monochrome receiver, as described in Application Report B183 for the TIFAX XM11 Teletext Decoder, and can also be derived from the $\overline{R}$, $\overline{G}$, $\overline{B}$ signals from source 27 by means of suitable logic switching circuits. In addition, the level of intensity of displayed graphics information also can be controlled in response to a conventional kinescope beam current control signal, such as can be derived by monitoring the resupply current supplied to the kinescope via the high voltage supply circuit of the receiver as is known.

What is claimed is:

1. In a video signal processing system including a video signal processing channel, a kinescope for displaying images derived from processed video signals, and means for coupling processed video signals from said video channel to intensity control electrodes of said kinescope, apparatus comprising:
   a source of signals containing graphics information to be displayed by said kinescope;
   means coupled to said source of signals for deriving therefrom signals representative of graphics information to be displayed;
   bias means for providing a graphics intensity bias signal representative of a desired intensity level of displayed graphics information;
   first switching means having a signal input terminal coupled to said video channel, a signal output terminal coupled to said coupling means, and a switching control input terminal;
   second switching means having a signal input terminal coupled to said graphics bias signal, a signal output terminal coupled to said coupling means, and a switching control input terminal; and
   control means responsive to output signals from said deriving means for providing switching control signals to said switching control input terminals of said first and second switching means, for (a) enabling said first switching means to conduct video signals to said coupling means, and disabling said second switching means to prevent conduction of said graphics bias signal to said coupling means in a normal operating mode of said system when video signals alone are to be displayed, and (b) disabling said first switching means to prevent conduction of video signals to said coupling means, and enabling said second switching means to conduct said graphics bias signal to said coupling means during graphics display intervals in a graphics display operating mode of said system.

2. Apparatus according to claim 1, wherein:
said source of signals provides composite video signals including encoded graphics information; and
said signal deriving means includes means for decoding said graphics information contained in said encoded video signal.

3. Apparatus according to claim 1, wherein:
said first and second switching means comprise signal transmission gates operable between conductive and nonconductive states.

4. Apparatus according to claim 1, wherein:
said coupling means comprises a video output amplifier stage for supplying amplified signals to said intensity control electrodes of said kinescope.

5. Apparatus according to claim 4, wherein:
said signal output terminals of said first and second switching means are coupled in common to a signal input of said amplifier stage.

6. Apparatus according to claim 2, wherein:
said decoding means provides an output blanking signal including a first blanking level in a first graphics display mode when graphics information is to be displayed exclusive of video information, and a second blanking level in a second graphics display mode when graphics information is to be displayed together with video image information; and wherein
said blanking signal is coupled to said video signal processing channel for inhibiting video signals processed by said channel in said first graphics display mode, and for enabling processing of video signals by said channel during image line display intervals in said second graphics display mode.

7. Apparatus according to claim 6, and further comprising:
third switching means coupled between said signal output terminal of said second switching means and a point of reference potential corresponding to a desired black level of a displayed image, and having a switching control input responsive to said blanking signal in said first graphics display mode, for rapidly connecting said output terminal of said second switching means to said reference potential at the end of graphics display intervals in said first graphics display mode.

8. Apparatus according to claim 1, wherein:
said bias means is coupled to said video channel for monitoring the magnitude of video signals processed by said channel; and wherein said bias means further includes
means for varying the magnitude of said graphics intensity bias signal in accordance with the magnitude of said video signals.

9. Apparatus according to claim 8, wherein said bias means further includes:
means for establishing a minimum level for said graphics intensity bias signal; and
means for establishing a maximum level of said graphics intensity bias signal.

10. Apparatus according to claim 9, and further comprising:
means coupled to said bias means for controlling the magnitude of said graphics intensity bias signal in a direction to reduce the magnitude of currents conducted by said kinescope in response to the magnitude of said graphics intensity bias signal, when currents associated with said bias signal exceed a level otherwise sufficient to cause excessive currents to be conducted by said kinescope.

11. In a color television receiver including a plurality of video signal paths for conducting a plurality of color image representative video signals derived from a composite television signal, said composite television signal subject to inclusion of encoded graphics information to be displayed; a kinescope for displaying images derived from said video signals and having a plurality of intensity control electrodes; and a video output amplifier stage having a plurality of signal inputs, for coupling said plural video signals to respective intensity control electrodes of said kinescope; apparatus comprising:
means, including graphics signal decoding means, for decoding said television signal to derive therefrom decoded output signals representative of said graphics information to be displayed;
bias means for providing a graphics intensity bias signal representative of a desired intensity level of displayed graphics information;

a plurality of video signal switching means, each having a signal input terminal coupled to a separate one of said video signal paths, a signal output terminal coupled to a separate one of said video amplifier inputs, and a switching control input terminal;

a plurality of graphics signal switching means, each having a signal input terminal coupled to said graphics bias signal, a signal output terminal coupled to a separate one of said video amplifier stage inputs, and a switching control input terminal; and control means responsive to output signals from said deriving means for providing switching control signals to said switching control input terminals of said video and graphics signal switching means, for (a) enabling said plurality of video switching means to conduct video signals to said video amplifier, and disabling said plurality of graphics switching means to prevent conduction of said graphics bias signal to said video amplifier in a normal operating mode of said receiver, and (b) disabling said plurality of video switching means to prevent conduction of video signals to said video amplifier, and enabling said plurality of graphics switching means to conduct said graphics bias voltage to said video amplifier during graphics display intervals in a graphics display operating mode of said receiver.

12. Apparatus according to claim 11, wherein:

said bias means is coupled to said plurality of video signal paths for monitoring the magnitude of video signals conducted by each of said signal paths; and wherein said bias means further includes means for varying the magnitude of said graphics intensity bias signal in accordance with the magnitude of video signals conducted by said plurality of signal paths.

13. Apparatus according to claim 12, wherein said bias means further includes:

means for establishing a minimum level for said graphics intensity bias signal; and means for establishing a maximum level of said graphics intensity bias signal.

14. Apparatus according to claim 13, and further comprising:

means coupled to said bias means for controlling the magnitude of said graphics intensity bias signal in a direction to reduce the magnitude of currents conducted by said kinescope in response to the magnitude of said graphics intensity bias signal, when currents associated with said bias signal exceed a level otherwise sufficient to cause excessive currents to be conducted by said kinescope.

* * * * *